Patented Jan. 17, 1950

2,495,141

UNITED STATES PATENT OFFICE 2,495,141

LATEX CREAMING IN THE PRESENCE OF DIBASIC SODIUM PHOSPHATE

Ernst Schmidt, Akron, Ohio, assignor to The Firestone Tire & Rubber Company, Akron, Ohio, a corporation of Ohio No Drawing. Application July 30, 1945, Serial No. 607,917

1 Claim. (Cl. 260—85.1)

This invention relates to the concentration of synthetic latices of rubber-like copolymers obtained from a diolefin and styrene or acrylonitrile, such as, for example, the Buna S and Buna N types of synthetic rubbers. More particularly, it relates to the addition of a strong electrolyte, preferably a salt, to such a latex to decrease its viscosity. Such addition permits concentrating the latex to higher solids content than otherwise and also hastens creaming of the latex. Reduced viscosity at higher latex concentrations is also beneficial in various latex processes.

Natural latex behaves very differently from such synthetic latices when a salt or other strong electrolyte of the type here contemplated is added to it. The addition to natural latex of a strong electrolyte increases the viscosity of the latex. The addition of the same electrolyte to a synthetic latex of such a rubber-like copolymer has the reverse effect. It decreases its viscosity.

The decrease in viscosity is preferably brought about by the addition of a soluble salt which is a strong electrolyte. Those which have a low pH and, therefore, tend to coagulate the latex should be used in conjunction with ammonia or other alkali in sufficient quantity to prevent coagulation. Any strong electrolyte salt of ammonium or an alkali metel—e. g., a chloride, sulfate, phosphate, ferrocyanide, etc., of ammonium, sodium or potassium—may be used. It appears that the use of an equivalent concentration of a salt is more important than the nature of the salt used.

The salt which is a strong electrolyte decreases the viscosity of a synthetic latex of such a rubber-like copolymer regardless of the concentration of the latex. The salt may be added to an ordinary latex or a concentrated or creamed latex. It is advantageously used in concentrating latices by evaporating, creaming, filtering, and the like to produce a higher concentrate for a given viscosity. It also hastens the creaming operation.

The following table illustrates the effect of adding different salts to a GR-S latex; i. e., a latex of a rubber-like copolymer of butadiene and styrene. In each of the examples recorded in the following table 4.61 grams of a 5 per cent solution of ammonium alginate were added to 100 parts of the latex. The latex contained no inhibitor. The latex had a pH of 7.98 and a solids content of 30.25 per cent.

TABLE I

*Effect of salts on efficiency of creaming*

| Water, c. c. | Substance Added | | | Cream, Percent Total Solids | Skim | |
|---|---|---|---|---|---|---|
| | c. c. | Percent | Compound | | Percent Total Solids | Percent Dry Polymer Content |
| 2.68 | | | | 41.0 | 3.00 | 2.38 |
| 1.71 | 0.97 | 20 | $KH_2PO_4$ | 46.7 | 2.68 | |
| 2.18 | 0.50 | 20 | $Na_2HPO_4$ | 45.8 | 2.72 | 1.96 |
| 1.68 | 1.00 | 20 | ----do---- | 47.0 | 2.66 | 1.76 |
| 0.68 | 2.00 | 20 | ----do---- | 47.8 | 2.84 | 1.67 |
| | 2.68 | 20 | ----do---- | 48.2 | 2.57 | 1.22 |
| | 2.68 | 20 | $Na_3PO_4.12H_2O$ | 47.0 | 2.59 | |
| 0.45 | { 1.23 <br> { 1.00 | 20 <br> 28 | NaCl <br> $NH_3$ | } 47.2 | 2.87 | |
| 1.19 | 1.49 | 20 | $Na_2SO_4$ | 49.2 | 2.82 | |
| | { 0.74 <br> { 1.98 | 40 <br> 28 | $(NH_4)_2SO_4$ <br> $NH_3$ | } 48.8 | 2.95 | |
| 1.68 | 1.00 | 28 | $NH_3$ | 44.4 | 2.90 | |
| 0.53 | 2.15 | 2N | KOH | 45.8 | 2.43 | |
| | { 0.68 <br> { 2.00 | 20 <br> 28 | Saponin <br> $NH_3$ | } 45.8 | 3.61 | |

Ammonia was added with the sodium chloride, ammonium sulfate, and saponin. All of the mixes were allowed to cream in graduated cylinders for 120 hours, and the degree of separation was observed from time to time. The cream of the skim or serum was then separated and analyzed for total solids content, which is reported in Table I. The addition of the salts increased the rate of creaming and also increased the solids content of the cream and reduced the solids content of the skim. The cream in each case was completely redispersible in water.

The following table illustrates the effect of various amounts of dibasic sodium phosphate on the viscosity of a GR-S latex (without inhibitor) for a given polymer content (46.7 per cent):

TABLE II

| Concentration of $Na_2HPO_4$ | Viscosity |
|---|---|
| | Centipoises |
| 0% on Aqueous Phase | 840 |
| 0.25% on Aqueous Phase | 16.1 |
| 0.50% on Aqueous Phase | 6.32 |
| 1.00% on Aqueous Phase | 3.53 |

The above tables relate only to the effect of certain strong electrolytes upon the viscosity of the latex and its effect on the creaming of the latex. Any ammonium or alkali metal salt which is a strong electrolyte may be used, and the reduction in viscosity will be found to have not only the indicated effect on the creamed product but will, likewise, aid in obtaining higher latex concentrates with other concentrating methods, such as evaporation, filtration, etc., which depend upon the viscosity of the latex.

The effect of dibasic sodium phosphate on the creaming of GR-S latex was studied, and the results on different latices of about 30 per cent total solids are recorded in Table III:

TABLE III

Effect of $Na_2HPO_4$ on creaming efficiency

| | Concentration on Aqueous Phase of— | | Per Cent Total Solids in Concentrate |
|---|---|---|---|
| | (a) $Na_2HPO_4$ | (b) Ammonium Alginate | |
| Latex A | 0 | 0.28 | 44.8 |
| | 1.3 | 0.28 | 55.2 |
| | 2.6 | 0.28 | 59.7 |
| | 0 | 0.40 | (¹) |
| | 1.3 | 0.40 | 50.3 |
| | 2.6 | 0.40 | 57.5 |
| Latex B | 0 | 0.28 | 37.3 |
| | 1.3 | 0.28 | 47.3 |
| | 2.6 | 0.28 | 55.6 |
| | 5.2 | 0.28 | 58.2 |
| Latex C | 0 | 0.165 | 49.7 |
| | 1.3 | 0.165 | 52.7 |
| | 0 | 0.205 | (¹) |
| | 1.3 | 0.205 | 53.9 |

¹ No creaming.

Three different latices were used. Ammonium alginate was used as a creaming agent in all cases. Different amounts of the alginate were used in the various experiments. The latices were allowed to cream in covered graduated cylinders at room temperature. The rate of creaming was increased considerably by the addition of phosphate in each instance. The viscosity of the latices and their concentrates was much lower than that of corresponding latices and concentrates containing none of the salt. A larger amount of the creaming agent may be used with a salt. All of these effects are increased by increasing the amount of the salt employed. The addition of the salt did not seem to affect the stability of the latices or the concentrates obtained therefrom. It was found that when 1.3 per cent of the salt was added to the latex identified as latex C in the above table, the concentrate had a viscosity of only about one-seventeenth that of an optimal concentrate obtained from the same latex but without the use of salt. This was true despite the fact that the salt-containing concentrate had a higher solids content than the salt-free concentrate. Both concentrates were creamed with the same amount of ammonium alginate.

Preliminary tests indicate that the addition of salts, etc., as here described has no deleterious effect on the stability or physical properties of the latex or vulcanizate obtained from it.

As the result of a great many tests with salts which are strong electrolytes, it has been found that of the rubber-like copolymers of butadiene and styrene, that known as GR-S type 3 (prepared from 50 per cent butadiene and 50 per cent styrene) is most affected by the salt. The dry rubber content of the creamed latex is increased considerably—perhaps 10 to 20 per cent. The rate of creaming is increased, and the viscosity of the latex is reduced.

Various tests were conducted to determine the effect of the addition of a salt of a strong electrolyte on the filtration of a latex. The following table shows the effect of adding dibasic sodium phosphate. This particular salt was selected as illustrative.

TABLE IV

| | Percent Total Solids in Filtered Concentrate |
|---|---|
| GR-S Latex—100 Parts | |
| +1 part conc. ammonia | 57.8 |
| +1 part conc. ammonia and 5 parts 10% soln. anhyd. $Na_2HPO_4$ | 63.7 |

The above table gives the results of filtering a GR-S latex of about 30 per cent solids content for about 1 hour through a laboratory porcelain filter, both with and without a small amount of phosphate. The difference in solids content is also very noticeable after filtering for a longer or shorter period.

The following table shows that the effect of the salt is dependent upon the amount employed. The table refers specifically to the effect of an increase in the concentration of a persulfate on the solids content of the filtrate obtained. In the table the amount of persulfate is expressed in the grams of a 10 per cent solution of $K_2S_2O_8$ added to 100 grams of GR-S latex, and the total solids content in the concentrate is expressed in terms of per cent by weight:

TABLE V

| Amount of Salt | Total Solids |
|---|---|
| Grams | Per cent |
| 0.0 | 48.0 |
| 5.8 | 55.8 |
| 16.0 | 62.3 |
| 44.2 | 66.3 |

The data included herein are merely illustrative of the effect of sodium phosphates and other salts and electrolytes on synthetic latex properties, such as the viscosity, rate of creaming, efficiency of filtering, and solids content of concentrates, etc. The invention is defined in the appended claim.

What I claim is:

The method of creaming latex of rubber-like copolymer of butadiene and styrene with ammonium alginate which comprises adding to the latex the ammonium alginate and 0.50 to 1.3 per cent of dibasic sodium phosphate (based on the weight of the aqueous phase of the latex), allowing the latex to cream, and then separating the concentrated latex and resulting skim.

ERNST SCHMIDT.

(References on following page)

REFERENCES CITED

The following references are of record in the file of this patent:

UNITED STATES PATENTS

| Number | Name | Date |
|---|---|---|
| 1,864,078 | Luther | June 21, 1932 |
| 2,357,861 | Willson | Sept. 12, 1944 |
| 2,362,052 | Craig | Nov. 7, 1944 |
| 2,400,164 | Peaker | May 14, 1946 |

FOREIGN PATENTS

| Number | Country | Date |
|---|---|---|
| 286,272 | Great Britain | June 4, 1929 |
| 472,912 | Great Britain | Oct. 1, 1937 |